United States Patent
Baltus et al.

(10) Patent No.: US 7,650,129 B2
(45) Date of Patent: Jan. 19, 2010

(54) RECEIVER FOR A MULTI-CARRIER SIGNAL

(75) Inventors: Petrus Gerardus Maria Baltus, Eindhoven (NL); Stephanus Josephus Maria Crijns, Eindhoven (NL); Paulus Wilhelmus Franciscus Gruijters, Eindhoven (NL); Oswald Josef Moonen, Eindhoven (NL); Peter Johannus Henricus Rutten, Eindhoven (NL)

(73) Assignee: NXP B.V., Eindhoven (NL)

( * ) Notice: Subject to any disclaimer, the term of this patent is extended or adjusted under 35 U.S.C. 154(b) by 524 days.

(21) Appl. No.: 11/547,435

(22) PCT Filed: Mar. 25, 2005

(86) PCT No.: PCT/IB2005/051033
§ 371 (c)(1),
(2), (4) Date: Sep. 28, 2006

(87) PCT Pub. No.: WO2005/096582
PCT Pub. Date: Oct. 13, 2005

(65) Prior Publication Data
US 2008/0242250 A1 Oct. 2, 2008

(30) Foreign Application Priority Data
Mar. 31, 2004 (EP) ................... 04101323

(51) Int. Cl.
*H04B 1/40* (2006.01)
(52) U.S. Cl. ...................... 455/258; 455/296

(58) Field of Classification Search ............... 455/296, 455/310, 313, 323, 324, 333, 334, 338, 255, 455/256, 257, 258, 259, 260, 316, 318
See application file for complete search history.

(56) References Cited

U.S. PATENT DOCUMENTS

| | | | |
|---|---|---|---|
| 6,148,047 A | 11/2000 | Mohindra | |
| 2003/0181187 A1* | 9/2003 | Liu | 455/302 |
| 2004/0087279 A1* | 5/2004 | Muschallik et al. | 455/73 |
| 2004/0196925 A1 | 10/2004 | Moore et al. | |
| 2008/0166978 A1* | 7/2008 | Cheah et al. | 455/75 |

FOREIGN PATENT DOCUMENTS

| | | |
|---|---|---|
| EP | 1 056 249 | 11/2000 |
| GB | 2213006 A * | 8/1989 |
| JP | EP 1056249 A2 * | 11/2000 |

* cited by examiner

*Primary Examiner*—Blane J Jackson

(57) ABSTRACT

A receiver which is arranged to receive an RF multi-carrier signal (60) comprises an in-phase mixer (51) for frequency down converting the RF multi-carrier signal to an in-phase multi-carrier signal (I) and a quadrature mixer (52) for frequency down converting the RF multi-carrier signal (60) to a quadrature multi-carrier signal. The receiver further comprises a local oscillator (60) arranged to generate in-phase and quadrature mixing signals (64,65) for the in-phase and quadrature mixers (51,52). The local oscillator (60) is further arranged to add a frequency offset to the in-phase and quadrature mixing signals (65, 65) so as to minimize an error vector magnitude of the in-phase and quadrature multi-carrier signals (I, Q).

9 Claims, 4 Drawing Sheets

RECEIVER FOR A MULTI-CARRIER SIGNAL

The invention relates to a receiver arranged to receive an RF multi-carrier signal. The invention further relates to a transmitter arranged to transmit an RF multi-carrier signal and to a transceiver comprising such a transmitter. In addition, the invention relates to a wireless device comprising such a transmitter.

Receivers for receiving RF multi-carrier signals are generally known in the art. In a typical receiver the RF multi-carrier signal is mixed down to an intermediate-frequency (IF) in-phase (I) and quadrature (Q) representation of the multi-carrier signal. The RF signal is mixed down by means of a pair of in-phase and quadrature mixing signals that have equal amplitudes but have also a 90-degree phase difference. When the phase difference between the mixing signals is not exactly 90 degrees and/or if the amplitude of the mixing signals does not exactly match, the demodulated multi-carrier signal can become distorted.

It is an object of the invention to provide a receiver for receiving RF multi-carrier signals which are less sensitive to deviations in phase and amplitude of the mixing signals. This is realized according to the invention in that the receiver comprises:

- an in-phase mixer for frequency down-converting the RF multi-carrier signal to an in-phase multi-carrier signal;
- a quadrature mixer for frequency down-converting the RF multi-carrier signal to a quadrature multi-carrier signal; and
- an oscillating means arranged to generate in-phase and quadrature mixing signals for the in-phase and quadrature mixers;
- wherein the oscillating means is further arranged to add a frequency offset to the in-phase and quadrature mixing signals so as to minimize an error vector magnitude of the in-phase and quadrature multi-carrier signals.

The invention is based upon the insight that phase and amplitude errors between the I-Q mixing signals may cause leakage of spectral components from one side of the (symmetrical) spectrum to the opposite side of the multi-carrier spectrum. Through this, some fraction of spectral components from one side of the spectrum may even be added to spectral components on the opposite side of the spectrum. Since, these fractions cannot be removed from the spectrum, they may distort the demodulated multi-carrier signal.

The invention is further based on the insight that by adding an offset frequency to a local oscillator, leakage itself is not prevented but instead, spectral components are leaked into harmless positions of the multi-carrier spectrum. According to the invention these harmless positions correspond to a location somewhere in between the subcarriers of the multi-carrier signal. As a result of this, the error vector magnitude of the demodulated signal can substantially be reduced. The present invention, avoids matching the I-Q mixing signals which otherwise would be required to prevent leakage.

In U.S. Pat. No. 6,148,047 also a frequency offset is added to a pair of quadrature mixing signals. However, this embodiment discusses the problem of compensating a DC offset in a zero-IF FM demodulator due to leakage of local oscillator signals into parts of the demodulator circuit. It does not discuss the problem addressed by the invention i.e., leakage of signal parts from one side of a multi-carrier spectrum to the other side of that same spectrum due to a mismatch in I-Q mixing signals.

In an embodiment of a receiver according to the present invention, the receiver comprises control means for determining the frequency offset. Through this, a suitable frequency offset can be determined in dependence on the received multi-carrier signal.

In another embodiment of the receiver according to the present invention, the control means are arranged to continuously determine the frequency offset. This embodiment provides the advantage that deteriorating effects such as, frequency shifts of the received signal or misalignments in the receiver due to temperature or aging, can be counteracted so that always an optimal frequency offset is provided.

In an embodiment of a receiver according to the present invention, the frequency offset corresponds to a quarter of a sub-carrier distance of the RF multi-carrier signal (60). This embodiment provides the advantage that eventual leaked spectral components end up exactly in the middle between two sub-carriers. This position is the optimum position since in general, most modulation schemes are the least sensitive to signals in that position. Moreover, signals can easily be suppressed from that position during the sub-carrier filtering process.

These and other aspects of the invention will be further elucidated by means of the following drawings.

Figure 1:
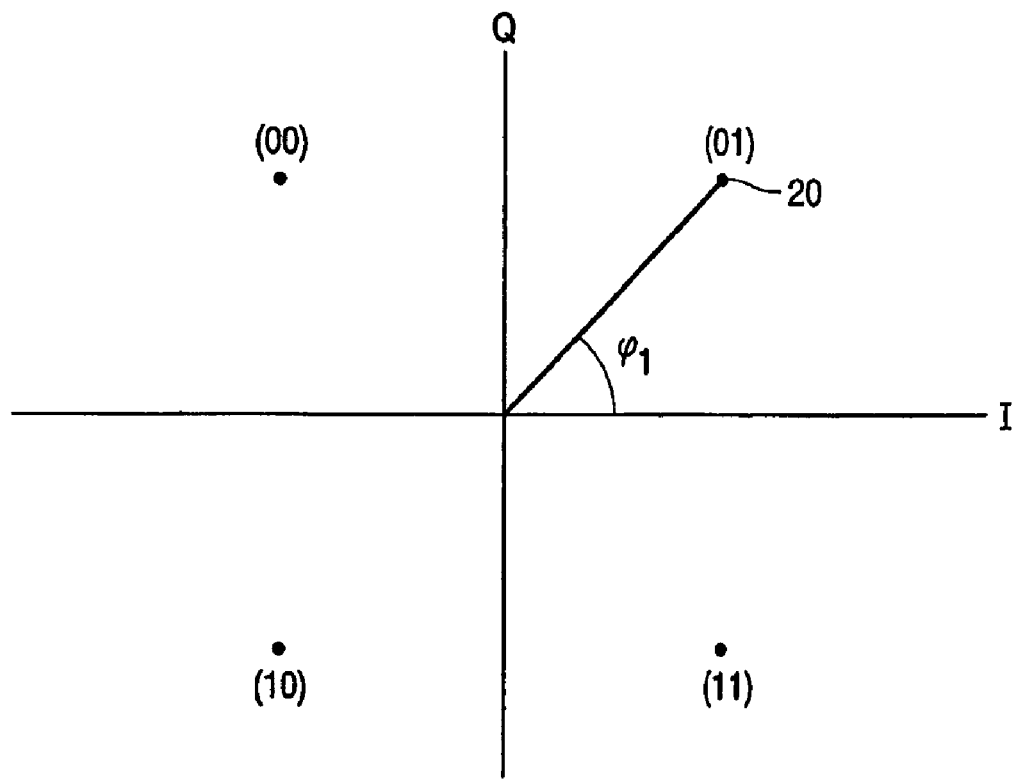
FIG. 1, shows a QPSK constellation for mapping bits of the multi-carrier signal to symbols.
Figure 2:
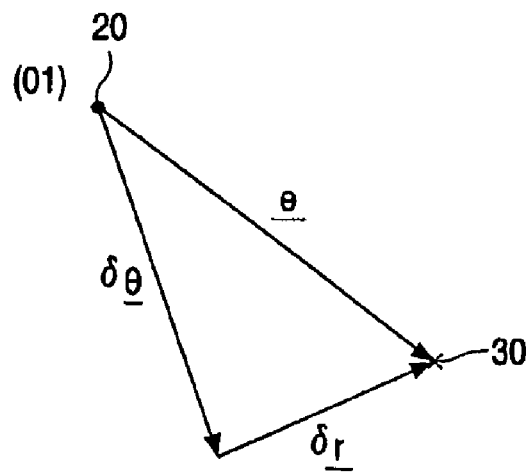
FIG. 2, shows the definition of the error vector e, which is used as a quality indicator (Error Vector Magnitude).

Multi-carrier signals are typically modulated using quadrature-based modulation techniques based on, for example, M-ary QAM like BPSK, QPSK, 16QAM or 64QAM in which bits are mapped onto symbols by means of so-called constellations. An example of such a constellation is provided by means of FIG. 1, in which a QPSK constellation is shown. According to this constellation, bits are mapped in pairs onto symbols. For example, bits (01) are mapped onto symbol 20, which represents the complex symbol 1+j which also can be expressed as a (normalized) vector $e^{-jx\,\Phi^1}$. At a receiver, the inverse operation is executed i.e. a detected symbol is mapped back into bits. In an ideal situation, detected symbols coincide with the symbols of a constellation, but this is often not the case. In FIG. 2 for example, a detected symbol 30 does not correspond to an expected symbol 20. The difference between an expected and the detected symbol can be expressed by means of an error vector e, which is the sum of a phase error vector $\delta\Theta$ and an amplitude error vector $\delta r$. The magnitude of the error vector e (Error Vector Magnitude) is frequently used by those skilled in the art as a single figure of merit to describe the overall signal quality of a digitally modulated RF signal. A poor EVM does not give information regarding its causes, but it indicates only that something is wrong within the signal path. Basically, EVM (expressed as either a percentage or as dB) is a system level measurement.

Figure 3:
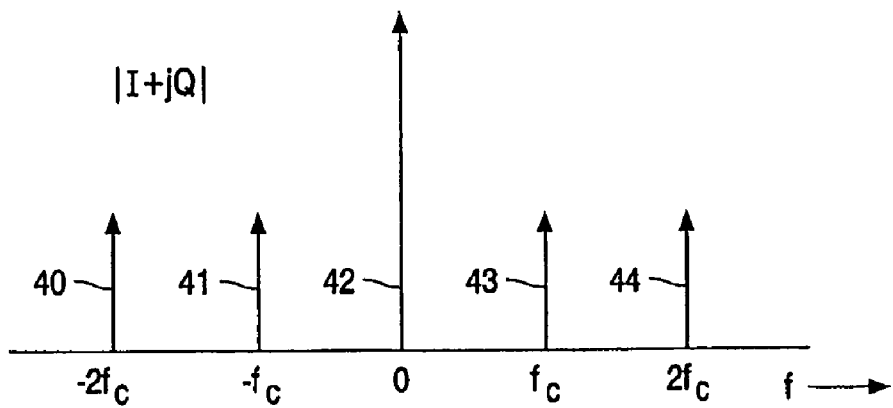
FIG. 3, shows a spectrum of a demodulated multi-carrier signal without signal leakage.

FIG. 3, shows a symmetrical spectrum of a demodulated multi-carrier signal. By way of example it is assumed that the corresponding RF multi-carrier has been demodulated to zero-IF. Shown is a spectrum having spectral components (sub-carriers) that, lie $f_c$ Hertz apart. It will be understood by those skilled in the art that FIG. 2 only shows a fraction 40-44 of the actual spectrum. In addition, it has been assumed that no leakage of signals from one side to the other side of the spectrum has occurred.

Figure 4:
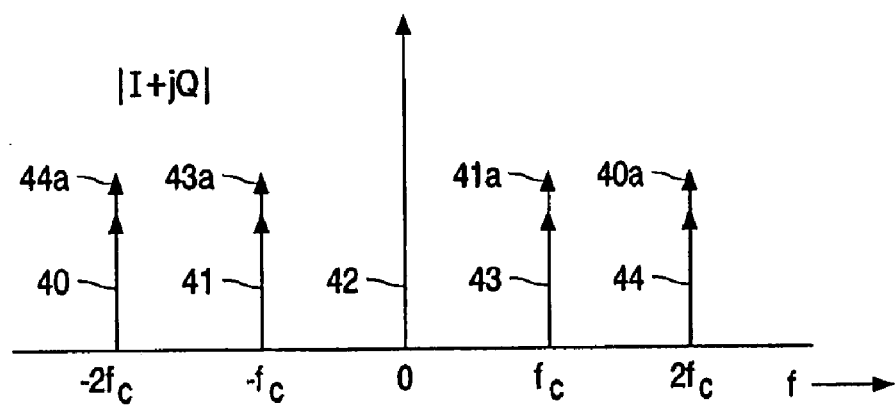
FIG. 4, shows a spectrum of a demodulated multi-carrier signal with signal leakage according to the prior art.

FIG. 4, shows a symmetrical spectrum of a demodulated multi-carrier signal suffering from leakage. This means that some fraction of spectral components (sub-carriers) from one side of the spectrum are leaked to the other side of the spectrum. For example, a fraction 40a of sub-carrier 40 is leaked on top of sub-carrier 44. Likewise, a fraction 44a of sub-carrier 44 is leaked on top of sub-carrier 40. This kind of leakage cannot be removed from the spectrum thereby causing distortions in the demodulated signal. It will be apparent to those skilled in the art that this will result in a poor Error Vector Magnitude and thus in an unreliable signal.

Figure 5:
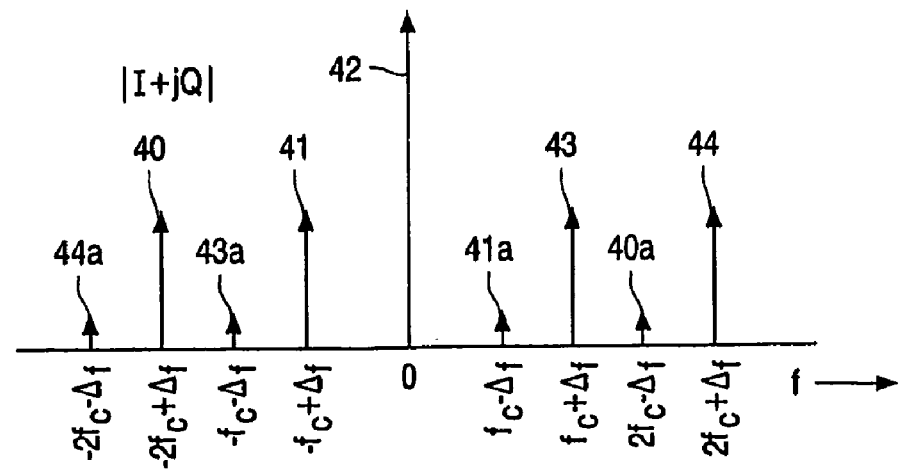
FIG. 5, shows a spectrum of a demodulated multi-carrier signal according to the present invention.

FIG. 5, shows a spectrum of a demodulated multi-carrier signal in which the frequency of the local oscillator has been offset by Δf Hertz. It is to be observed that spectral components are not leaked on top of other spectral components, but instead are leaked in-between the sub-carriers of the multi-carrier signal. It should be noted that according to the invention, leakage is not prevented but instead signals are leaked into harmless positions. The invention further provides the advantage that no additional components are needed at the receiver/transmitter except of course the requirement that the oscillator possess a sufficiently small step size to allow tuning to the required frequency. Apparently, in an optimal situation, the leaked components end up exactly in the middle between two sub-carriers. It can easily be proved by those skilled in the art, that in this optimal situation the frequency offset Δf corresponds to $\Delta f = \pm 1/4 * fc$.

Figure 6:
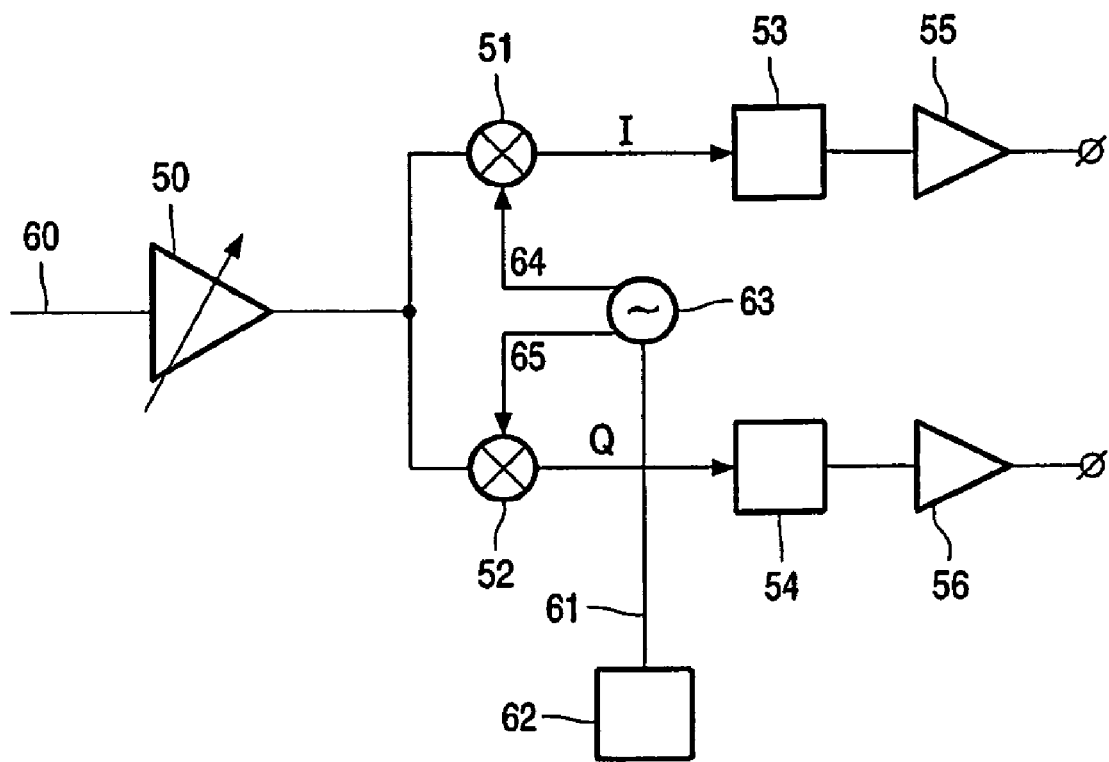
FIG. 6, shows a receiver according to the present invention.

FIG. 6 shows an example of a receiver according to the invention. Multi-carrier signal 60 is amplified by voltage controlled amplifier 50. In a next step, the amplified signal is frequency down converted to an in-phase I and a quadrature component Q using mixers 51 and 52 and corresponding quadrature mixing signals 64,65 which are obtained from oscillating means 63 which could for example comprise a VCO or a PLL or another controllable oscillator known in the art. However, the step size of the oscillating means 63 should be sufficiently small. Although, ideally, these mixing signals are exactly of equal magnitude and are having exactly a ninety-degree phase shift, it is allowed according to the present invention that the quadrature mixing signals 64,65 are misaligned. Signal 61 instructs the oscillating means 63 to offset the mixing signals 64,65 by a frequency offset Δf. According to the present invention, the optimal frequency offset can be set once only, or can be determined continuously and controlled by, for example, control means 62. Deteriorating effects such as, frequency shifts of the received signal, misalignments in the receiver due to e.g. temperature or aging effects, can be counteracted by control means 62, so that always the optimum frequency offset is provided. Merely by way of example, the receiver as shown in FIG. 6 further comprises baseband filters 53 and 54 for baseband filtering the frequency down-converted in-phase (I) and quadrature (Q) signals and buffers 55 and 56 which may be used as e.g. 50 ohm line drivers.

Figure 7:
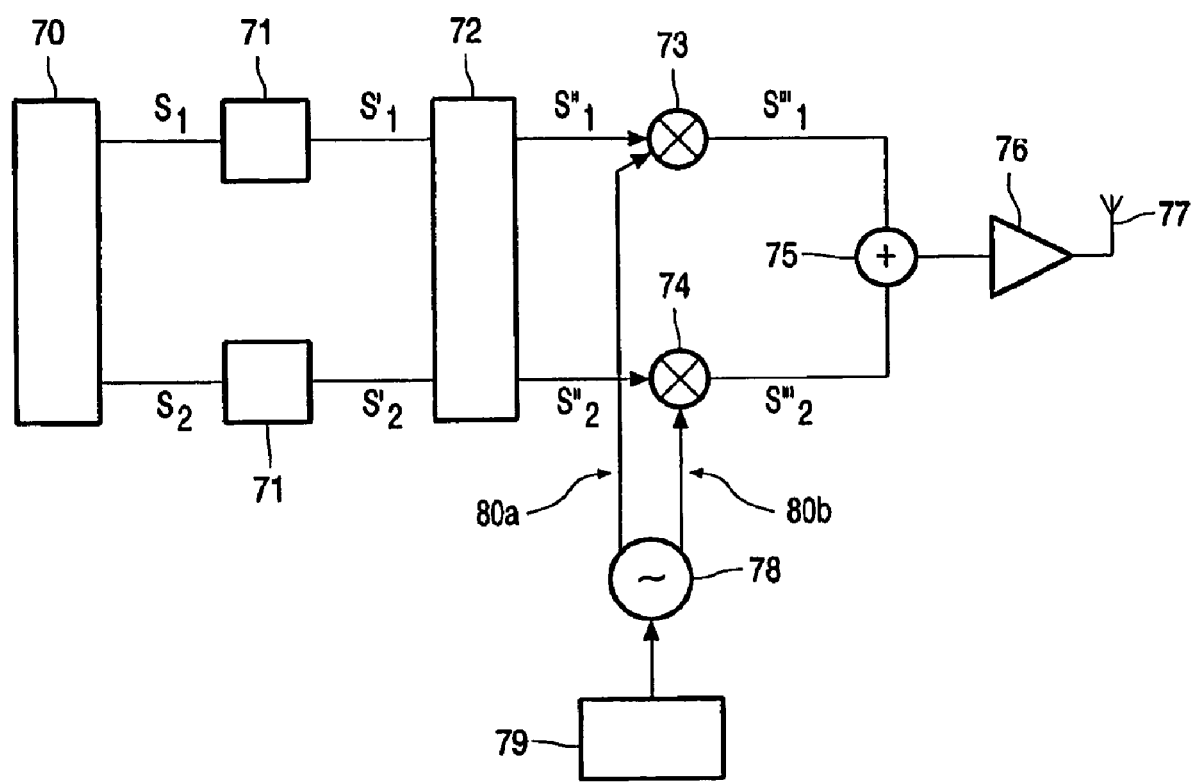
FIG. 7, shows a transmitter according to the present invention.

FIG. 7 shows a transmitter according to the invention. Digital signals are processed and mapped onto symbols by processing means 70. The encoded digital signals $s_1$, $s_2$ are converted into analog signals $s'_1$ and $S'_2$ by a pair of digital-to-analog converters 71. Signals $s'_1$ and $s'_2$ are filtered in digital filter 72 and subsequently frequency up-converted by means of a pair of mixers 73 and 74. A pair of quadrature mixing signals 80a, 80b are applied to these mixers 73, 74. The transmitter further comprises control means 79 for determining an optimal frequency offset that is added to the quadrature mixing signals 80a, 80b. The frequency up-converted signals are added together by means of adding element 75, amplified by means of amplifier 76 and finally, transmitted by antenna 77. Oscillating means 78 may comprise any suitable controllable oscillator known in the art. The only requirement is that the frequency step size is sufficiently small. Such oscillating means 78 may for example comprise a VCO or a PLL.

Figure 8:
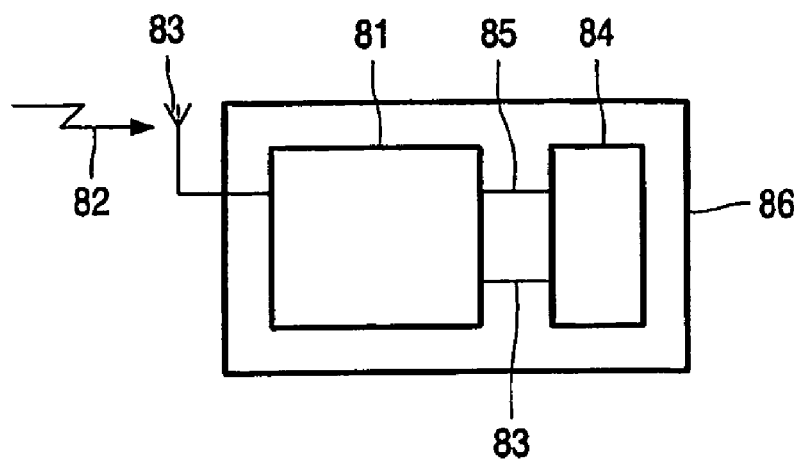
FIG. 8, shows a wireless device comprising a receiver according to the present invention.

FIG. 8 shows a wireless device 80 such as a mobile phone, a personal digital assistant or a wireless interface card comprising a receiver 81 according to the invention. In FIG. 8, radio signals 82 are received by antenna 83. Receiver 81 demodulates the received radio signal 82 into in-phase 85 and quadrature 83 signals, which are subsequently transferred to processing means 84 for further processing. Apparently, such wireless device may also comprise a transmitter according to the present invention (not shown).

It should be noted that the above-mentioned embodiments illustrate rather than limit the invention, and that those skilled in the art will be able to design many alternative embodiments without departing from the scope of the appended claims. All signal processing shown in the above embodiments can be carried out in the analog domain and the digital domain. The word "comprising" does not exclude the presence of elements or steps other than those listed in a claim. The word "a" or "an" preceding an element does not exclude the presence of a plurality of such elements. The mere fact that certain measures are recited in mutually different dependent claims does not indicate that a combination of these measures cannot be used to advantage.

The invention claimed is:

1. Receiver arranged to receive an RF multi-carrier signal the receiver comprising:
    an in-phase mixer for frequency down-converting the RF multi-carrier signal to an in-phase multi-carrier signal;
    a quadrature mixer for frequency down-converting the RF multi-carrier signal to a quadrature multi-carrier signal; and
    an oscillating means arranged to generate in-phase and quadrature mixing signals for the in-phase and quadrature mixers,
    wherein the oscillating means is further arranged to add a frequency offset to the in-phase and quadrature mixing signals to minimize an error vector magnitude of the in-phase and quadrature multi-carrier signals.

2. Receiver according to claim 1, comprising control means for determining the frequency offset.

3. Receiver according to claim 2, wherein the control means are arranged to continuously determine the frequency offset.

4. Receiver according to claim 1, wherein the frequency offset corresponds 20 to a quarter of a sub-carrier distance of the RF multi-carrier signal.

5. Receiver according to claim 1, wherein the RF multi-carrier signal is an Orthogonal Frequency Division Multiplexed signal.

6. Transmitter for transmitting an RF multi-carrier signal comprising:
    an in-phase mixer for frequency up-converting a lower frequency inphase multi-carrier signal to an RF in-phase multi-carrier signal;
    a quadrature mixer for frequency up-converting a lower frequency quadrature multi-carrier signal to an RF quadrature signal; and an oscillating means arranged to generate in-phase and quadrature mixing signals for the in-phase and quadrature mixers, wherein the oscillating means is further arranged to add a frequency offset to the in-phase and quadrature mixing signals to minimize an error vector magnitude of the RF in-phase and quadrature multi-carrier signals.

7. Transceiver comprising a receiver that is arranged to receive an RF multicarrier signal, the receiver comprising:

a first in-phase mixer for frequency down-converting the RF multi-carrier signal to a first in-phase multi-carrier signal;

a first quadrature mixer for frequency down-converting the RF multicarrier signal to a first quadrature multi-carrier signal; and a first oscillating means arranged to generate first in-phase and quadrature mixing signals for the first in-phase and quadrature mixers, wherein the first oscillating means is further arranged to add a frequency offset to the first in-phase and quadrature mixing signal to minimize an error vector magnitude of the first in-phase and quadrature multi-carrier signals.

8. Transceiver according to claim 7, comprising a transmitter for transmitting an RF multi-carrier signal, the transmitter comprising:

a second in-phase mixer for frequency up-converting a lower frequency in-phase multi-carrier signal to an RF in-phase multi-carrier signal;

a second quadrature mixer for frequency up-converting a lower frequency quadrature multi-carrier signal to an RF quadrature signal; and a second oscillating means arranged to generate a second in-phase mixing signal for the second in-phase mixer and a second quadrature mixing signal for the second quadrature mixer, wherein the second oscillating means is further arranged to add a frequency offset to the second in-phase and quadrature mixing signals so as to minimize an error vector magnitude of the RF in-phase and quadrature multi-carrier signals.

9. Wireless device comprising a receiver that is arranged to receive an RF multi-carrier signal the receiver comprising:

an in-phase mixer for frequency down-converting the RF multi-carrier signal to an in-phase multi-carrier signal;

a quadrature mixer for frequency down-converting the RF multi-carrier signal to a quadrature multi-carrier signal; and an oscillating means arranged to generate in-phase and quadrature mixing signals for the in-phase and quadrature mixers, wherein the oscillating means is further arranged to add a frequency offset to the in-phase and quadrature mixing signals to minimize an error vector magnitude of the in-phase and quadrature multi-carrier signals.

* * * * *